United States Patent
Holley

(10) Patent No.: US 8,719,885 B2
(45) Date of Patent: May 6, 2014

(54) SYSTEMS AND METHODS FOR ACCESSING RECOVERABLE PROGRAM CONTENT

(75) Inventor: Eric Holley, Atlanta, GA (US)

(73) Assignee: EchoStar Technologies L.L.C., Englewood, CO (US)

( * ) Notice: Subject to any disclaimer, the term of this patent is extended or adjusted under 35 U.S.C. 154(b) by 1027 days.

(21) Appl. No.: 12/627,669

(22) Filed: Nov. 30, 2009

(65) Prior Publication Data

US 2011/0131620 A1    Jun. 2, 2011

(51) Int. Cl.
*H04N 7/173* (2011.01)

(52) U.S. Cl.
USPC .............................................. 725/98; 725/100

(58) Field of Classification Search
USPC ................................................... 725/98, 100
See application file for complete search history.

(56) References Cited

U.S. PATENT DOCUMENTS

| | | | |
|---|---|---|---|
| 6,208,620 B1 * | 3/2001 | Sen et al. ....................... | 370/231 |
| 6,965,916 B1 | 11/2005 | Kling et al. | |
| 7,571,348 B2 * | 8/2009 | Deguchi et al. ................. | 714/15 |
| 7,996,459 B2 * | 8/2011 | Ludvig et al. .................. | 709/203 |
| 2002/0036637 A1 * | 3/2002 | Ogawa ........................... | 345/212 |
| 2002/0129374 A1 * | 9/2002 | Freeman et al. ................ | 725/91 |
| 2005/0251827 A1 * | 11/2005 | Ellis et al. ....................... | 725/47 |
| 2006/0148400 A1 * | 7/2006 | Farrow .......................... | 455/3.02 |
| 2006/0212911 A1 * | 9/2006 | MacMullan et al. ............ | 725/81 |
| 2007/0107025 A1 * | 5/2007 | Li et al. .......................... | 725/97 |
| 2008/0086743 A1 * | 4/2008 | Cheng et al. .................... | 725/38 |
| 2009/0031357 A1 * | 1/2009 | Ko ................................. | 725/50 |
| 2009/0064238 A1 | 3/2009 | White et al. | |
| 2009/0086761 A1 * | 4/2009 | Mirmobini et al. ........... | 370/476 |
| 2009/0157797 A1 | 6/2009 | Chang et al. | |
| 2009/0205001 A1 * | 8/2009 | Naylor et al. ................... | 725/82 |
| 2010/0046634 A1 * | 2/2010 | Dai et al. ................. | 375/240.25 |
| 2010/0146579 A1 * | 6/2010 | Reams et al. ................. | 725/131 |
| 2010/0231797 A1 * | 9/2010 | Jiang et al. .................... | 348/607 |
| 2010/0238789 A1 * | 9/2010 | Qiu et al. ....................... | 370/216 |
| 2011/0119546 A1 * | 5/2011 | Ver Steeg et al. ............. | 714/748 |

OTHER PUBLICATIONS

Antony Dove, Systems and Methods for Catch-Up Electronic Program Guide, U.S. Appl. No. 12/423,630, filed Apr. 14, 2009.

* cited by examiner

*Primary Examiner* — Pankaj Kumar
*Assistant Examiner* — Franklin Andramuno
(74) *Attorney, Agent, or Firm* — Lowe Graham Jones PLLC

(57) ABSTRACT

Content delivery systems and methods are operable to provide recoverable program content to a media device. An exemplary embodiment detects an occurrence of a qualifying event, wherein the qualifying event is associated with an unavailable portion of a program of interest; communicates a request to establish a backchannel between the media device and a program content device in response to detecting the occurrence of the qualifying event; communicates a request for a recoverable portion of the program of interest from the media device to the program content device over the backchannel, wherein the requested recoverable portion of the program of interest corresponds to the unavailable portion of the program of interest; and receives at the media device the recoverable portion of the program of interest from the program content device.

10 Claims, 4 Drawing Sheets

134

| CURRENT TIME: 9:20 P.M. |||||||
| CURRENT DATE: APRIL 1 |||||||
| CHANNEL | 8:00 P.M. | 9:00 P.M. | 10:00 P.M. | 11:00 P.M. | 12:00 ||
| STATION A | PROGRAM A1 (8:00-11:00 P.M.) ||| PROGRAM A2 ||
| STATION B | PROG B1 | PROG B2 | PROGRAM B3 ||||
| STATION C | PROG C1 | PROG C2 | PROG C3 | PROG C4 | PRO |
| STATION D | PROGRAM D1 || PROGRAM D2 | PROGRAM D3 ||
| STATION E | PROGRAM E1 ||||||
| STATION F | PROG F1 | PROGRAM F2 |||| PRO |
| STATION G | PROG G1 | PROG G2 | PROG G3 | PROG G4 | PRO |

SYSTEMS AND METHODS FOR ACCESSING RECOVERABLE PROGRAM CONTENT

BACKGROUND

Satellite-based content delivery systems receive program content from a transmitting facility, referred to as a media transmit facility or a head end facility, via one or more satellites. The program content is received at an antenna and is processed by a suitable media device, such as a set top box. The delivered program content, which may be comprised of video and/or audio information, is streamed to a media presentation device for presentation to a user. Non-limiting examples of a media device are stereos, radios, televisions (TVs), digital video disc (DVD) players, digital video recorders (DVRs), or personal computers (PCs), or the like.

Typically, the program content is transmitted in a streaming manner. Thus, once the antenna is adjusted to receive the streamed program content from the satellite, the program content may be provided to a viewer in a continuous, streaming manner.

However, under various conditions, a service interruption may occur. For example, receipt of the program content stream may be interrupted or interfered with, such as when precipitation interrupts and/or interferes with the program content stream being broadcast from the transmit facility to the satellite, and/or from the satellite to the antenna at the user's location. As another example, a service interruption may result when one or more components experience a partial or complete failure, thus interrupting delivery and/or processing of the program content stream.

Prior art systems may employ data redundancy schemes to improve the reliability of program content delivery. However, no level of redundancy will remedy a complete loss of the program content stream signal.

In other situations, the user's viewing activities may also interfere with program content viewing. For example, the viewer may temporarily leave the room, and accordingly, miss a portion of a presented program of interest. Or, the viewer may start viewing a program of interest after the start of the program of interest, thereby missing the initial portion of the program of interest. Or, the viewer may realize that presentation of the program of interest has already concluded, and thus, the viewer has entirely missed presentation of the program of interest.

Prior art systems may employ a digital video recorder or other program content recording-based system so that some of, or all of, the program of interest is saved for later viewing. However, such recording systems must be operated in response to specific viewer input, typically before the program content of the program of interest is streamed out from the media transmit facility. That is, if the viewer has not pre-specified recording of a particular program of interest, it is not saved by the recording system.

Accordingly, there is a need to provide program content during service interruptions. Further, there is a need to provide program content in situations where the viewer wishes to access previously presented program content.

SUMMARY

Program content retrieval systems and methods are operable to retrieve recoverable program content that is not currently available at a media device. An exemplary embodiment detects an occurrence of a qualifying event, wherein the qualifying event is associated with an unavailable portion of a program of interest; communicates a request to establish a backchannel between the media device and a program content device in response to detecting the occurrence of the qualifying event; communicates a request for a recoverable portion of the program of interest from the media device to the program content device over the backchannel, wherein the requested recoverable portion of the program of interest corresponds to the unavailable portion of the program of interest; and receives at the media device the recoverable portion of the program of interest from the program content device.

BRIEF DESCRIPTION OF THE DRAWINGS

Preferred and alternative embodiments are described in detail below with reference to the following drawings.

DETAILED DESCRIPTION

Figure 1:
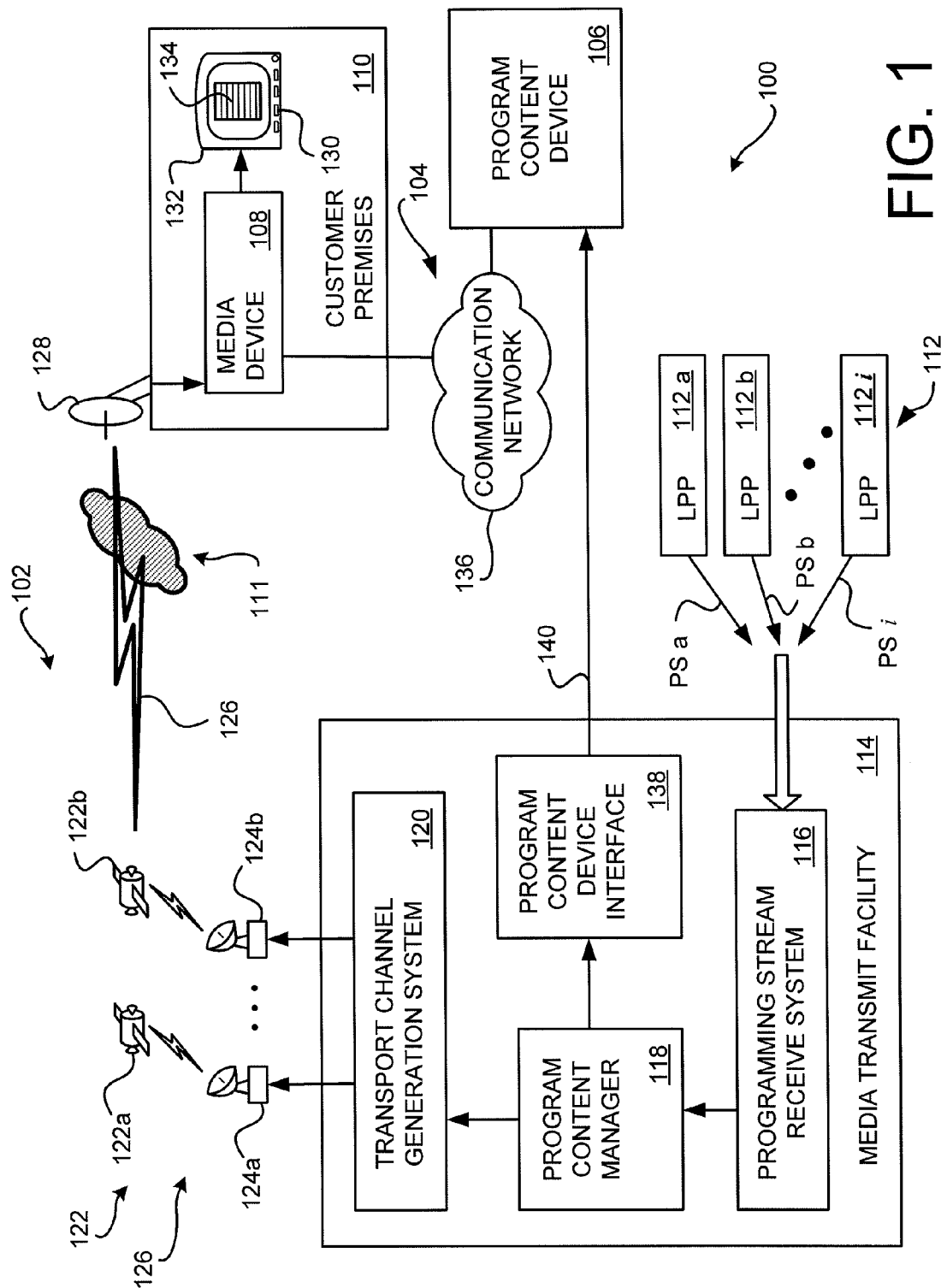
FIG. 1 is a block diagram of an embodiment of a program content retrieval system implemented in a satellite-based program content delivery system.

FIG. 1 is a block diagram of an embodiment of a program content retrieval system 100 implemented in a satellite-based program content delivery system 102. Specified program content is retrieved over a backchannel 104 from a program content device 106 by a media device 108 located at a customer premises 110.

If a service interruption occurs, reception of the program content by the media device 108 is interrupted. The interrupted program content is requested and then delivered to the media device 108 over the backchannel 104. For example, satellite signal reception can be degraded or interrupted during a rain storm 111 with heavy precipitation. The interruption can be intermittent, or continuous, until the precipitation level decreases below the interference threshold of the satellite signal. Embodiments of the program content retrieval system 100 detect such service interruptions, and in the event programming of interest is being viewed and/or recorded, identifies the interrupted program content. Once the interrupted program content has been received by the media device 108, the program content received from the satellite signal can be "stitched" together with the received interrupted program content so as to provide the entirety of the program of interest.

In overview, a media provider employs a media communication system to provide programming content to its customers. In the exemplary satellite-based program content delivery system 102, the media provider receives a plurality of programs PSa-PSi from local programming providers 112 (LPPs 112a-112i). The programs PSa-PSi are communicated to a media transmit facility 114, operated by the media provider, and are received by a programming stream receive system 116.

The programming stream receive system 116 communicates the received programs PSa-PSi to a program content manager 118. The program content manager 118 processes the received programs PSa-PSi as necessary to prepare them for transmission to the customers of the media provider. For example, commercials or the like may be incorporated with a particular one of the programs PSa-PSi by the program content manager 118.

The processed programs PSa-PSi are communicated from the program content manager 118 to a transport channel generation system 120. The transport channel generation system 120 bundles selected ones of the programs PSa-PSi into one or more transport channels. Then, the one or more of the transport channels are uplinked to one or more satellites 122, via a corresponding transmit antenna 124. The transport channel is uplinked using a wireless signal 126.

The respective transport channels are then communicated from respective ones of the satellites 122 down to a receiver antenna 128 located at the customer premises 110. The received signal with the transport channel therein is then communicated from the receiver antenna 128 to the media device 108. The receiver antenna 128 and the media device 108 may be configured to receive multiple transport channels from a plurality of satellites 122.

A program of interest Pi may be selected by a viewer who provides suitable instructions to the media device 108. The program of interest Pi is identified by its particular "channel" in the received transport channel. The media device 108 tunes itself to the particular transport channel on which the program of interest Pi is available, and then retrieves the selected program of interest Pi from the transport channel based on its assigned identifier, such as a packet identifier (PID) or the like.

The program of interest Pi is then assembled into a stream of program content that is communicated from the media device 108 to a media presentation device 130. For example, but not limited to, the media device 108 may be a set top box (STB) that is coupled to the suitable media presentation device 130, such as a television (TV), personal computer (PC), or the like. A display 132 of the media presentation device 130 presents a video portion of the selected program of interest Pi to the viewer.

To aid the viewer in the selection of a program of interest Pi, an electronic program guide (EPG) 134 may be presented to the viewer on the display 132 (typically in response to a viewer request to view the EPG 134). Thus, the viewer may navigate about the EPG 134 to obtain information about available programs. Using the EPG 134, the viewer may select a particular program of interest Pi for current viewing, future viewing, and/or recording.

The media device 108 implemented with embodiments of the program content retrieval system 100 requests, and then receives, interrupted program content of interest over the backchannel 104. Any suitable backchannel 104 may be used by the media device 108 to retrieve the interrupted program content from the program content device 106. Accordingly, the media device 108 and the program content device 106 are communicatively coupled together via a communication network 136. In an exemplary embodiment, the communication network 136 is the Internet. Accordingly, communications between the media device 108 and the program content device 106 would then occur over the Internet using a suitably configured application. For example, but not limited to, the backchannel 104 may be configured to use TCP/IP-based or HTTP-based communications.

The communication network 136 is illustrated as a generic communication system. In the various embodiments, the media device 108 and the program content device 106 may be communicatively coupled together via any suitable type of communication network 136. For example, the communication network 136 may be a telephony system, a radio frequency (RF) wireless system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments of the program content retrieval system 100 may be implemented on other types of communication technologies, such as but not limited to, digital subscriber loop (DSL), X.25, Internet Protocol (IP), Ethernet, Integrated Services Digital Network (ISDN) and asynchronous transfer mode (ATM). Also, embodiments of the program content retrieval system 100 may be employed on combination systems having a plurality of segments which employ different formats for each segment employing different technologies on each segment.

In the various embodiments, the program content manager 118 provides the programs PSa-PSi to the program content device 106, via a program content device interface 138. Accordingly, a connection 140 is provided between a media transmit facility interface 206 and the program content device 106.

Figures 2, 5:
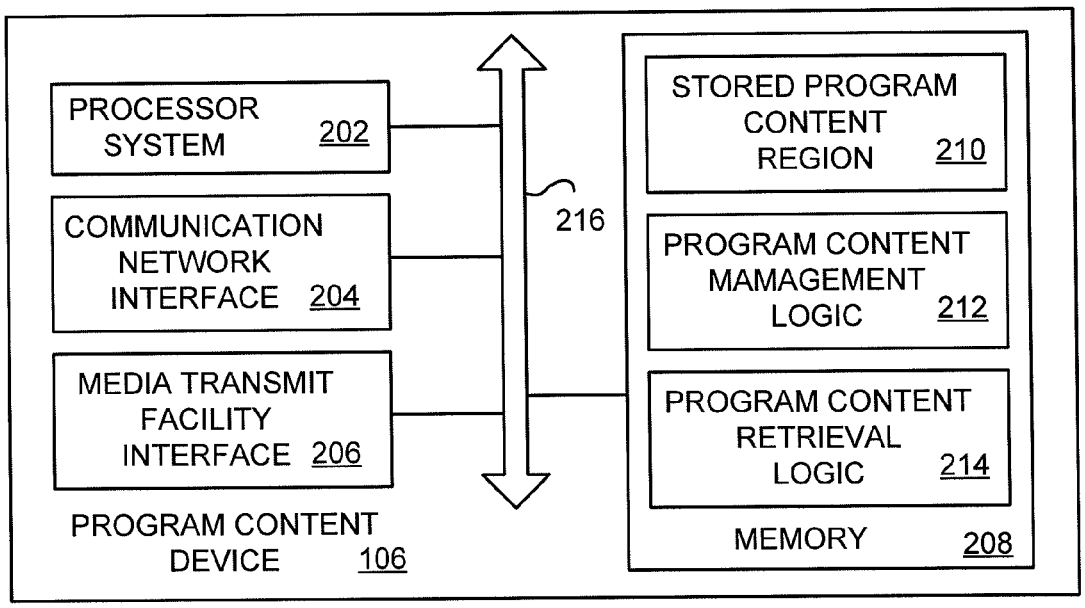
FIG. 2 is a block diagram of a program content device.
FIG. 5 is a block diagram of a hypothetical current electronic program guide generated by the media device and presented on a media presentation device.

FIG. 2 is a simplified block diagram of an exemplary program content device 106. The exemplary program content device 106 includes at least a processor system 202, at least one communication network interface 204, a media transmit facility interface 206, and a memory 208. Memory 208 includes a stored program content region 210, program content management logic 212, and program content retrieval logic 214.

The processor system 202, the communication network interface 204, the media transmit facility interface 206, and the memory 208 are communicatively coupled to a communication bus 216, thereby providing connectivity between the above-described components. In alternative embodiments of the program content device 106, the above-described components may be communicatively coupled to each other in a different manner. For example, one or more of the above-described components may be directly coupled to the processor system 202, or may be coupled to the processor system 202 via intermediary components (not shown). Further, additional components (not shown) may be included in alternative embodiments of the program content device 106.

The media transmit facility interface 206 of the program content device 106 is communicatively coupled to the program content device interface 138 of the media transmit facility 114, via connection 140. Preferably, connection 140 is a high speed, high capacity connection so that relatively large amounts of program content can be transferred to the program content device 106 on a real time, or near real time, basis. Non-limiting examples of the connection 140 include coaxial cables, fiber optic cables, or other suitable high-capacity packet-based network connections, such as those available for lease through third-party vendors. In some embodiments, an antenna (not shown) may be alternatively used to receive program content from one or more of the satellites 122.

The selected ones of the programs PSa-Psi received from the media transmit facility 114 are stored by the program content device 106 in the stored program content region 210 of memory 208. It is appreciated that relatively large amounts of programming content is saved at the program content device 106. Accordingly, a predefined storage duration is used to limit the amount of program content that is stored at any given time. For example, a predefined storage duration of five hours of program content may be defined such that five hours of current program content is stored in the stored program content region 210. Thus, when a particular media device 108 requests interrupted program content, the particular requested program content of interest is likely available at the program content device 106 for retrieval and delivery to the requesting media device 108. Any suitable predefined storage duration may be used by the various embodiments.

Management of received and stored program content is performed by the program content management logic 212. As noted herein, a predefined storage duration is used to limit the amount of program content stored in the stored program content region 210. Thus, the program content management logic 212 manages the storage of newly received program content, and manages the removal of stored program content that is older than the predefined storage duration (stale program content). For example, if the predefined storage duration is five hours, stale program content that has been stored for five hours or more can be deleted, erased or otherwise discarded so as to make room for newly received program content.

In some embodiments, only selected ones of the programs PSa-Psi are communicated to, and then stored by, the program content device 106. For example, one or more of the programs PSa-Psi may be stored on another system, such as a video-on-demand system or the like. Thus, a viewer can obtain those programs from the other system. By selectively choosing the programs PSa-Psi for storage at the program content device 106, memory capacity of the memory 208 may be better managed.

Further, different predefined storage durations may be used for different program channels. For example, the predefined storage duration for a channel that provides primarily movie programming may be longer than the predefined storage duration for a channel that provides primarily hour or half hour programs. Control of the storage, and the subsequent deletion, erasing, or discarding of stale program content based upon one or more predefined storage durations defined for a particular channel allows for management of the memory capacity of the memory 208.

Embodiments of the program content device 106 include at least one communication network interface 204 that is communicatively coupled to the communication network 136. Preferably, the communication network interface 204 is configured with sufficient connection capacity to handle simultaneous communications with a plurality of different media devices 108. At any given moment in time, a large number of media devices 108 may be subject to the same service interruption, or a concurrent service interruption. For example, a severe storm may cause a service interruption for many media devices 108. Such concurrently interrupted media devices 108 are likely to be processing and presenting different programs of interest to their respective viewers. With the various embodiments, the different media devices 108 are able to access their particular programs of interest from the program content device 106 on a real time, or near real time basis, so as to maintain service to their respective viewers. Depending upon design considerations, multiple communication network interfaces 204 may be installed in the program content device 106.

Further, different communication network interfaces 204 may be configured to support different types of communication media. For example, one or more of the communication network interfaces 204 may be configured to support Internet type communications, and other ones of the communication network interfaces 204 may be configured to support cable system communications. A communication network interface 204 may be configured to support any suitable type of communication media whereby a media device 108 requests and receives the recoverable interrupted program content.

The program content retrieval logic 214 is responsive to requests for recoverable interrupted program content from one or more media devices 108. Based upon the request for recoverable interrupted program content, the program content retrieval logic 214 accesses the memory 208, and retrieves requested interrupted program content from the stored program content region 210.

The current program content management logic 212 and the program content retrieval logic 214 are described as discrete logic. In other embodiments, the program content management logic 212 and the program content retrieval logic 214 may be integrated logic, or even combined with other logic not described herein. Further, the program content management logic 212 and the program content retrieval logic 214 are described as residing in the memory 208. In other embodiments, the logic 212 and/or 214 may reside in a different memory media and/or device.

In practice, a plurality of program content devices 106 would be distributed at selected locations to provide localized access over a predefined geographic region, or to provide sufficient access capacity for many media devices 108 that might require concurrent access to the recoverable program content. For example, if the media service provider transmits programming content across the continental United States via a plurality of satellites 122, one or more program content devices 106 might be located near a large city on the east coast and one or more other program content devices 106 might be located near a large city on the west coast. Accordingly, access requirements, and the associated costs, may be managed by the service provider.

Further, the use of a program content device 106 to provide service to a particular geographic region may facilitate management of program content storage capacity. For example, programming provided by a local programming station in the geographic region serviced by a particular program content device 106 could be stored at the program content device 106, whereas programming provided by programming stations serving other cities far removed from the geographic region serviced by a particular program content device 106 might not be stored.

In FIG. 2, the program content device 106 is illustrated as being remote from the media transmit facility 114. In other embodiments, the program content device 106 may reside within the media transmit facility 114. In such embodiments, all of, or portions of, the program content device 106 may be integrated with various components of a media transmit facility 114.

Figure 3:
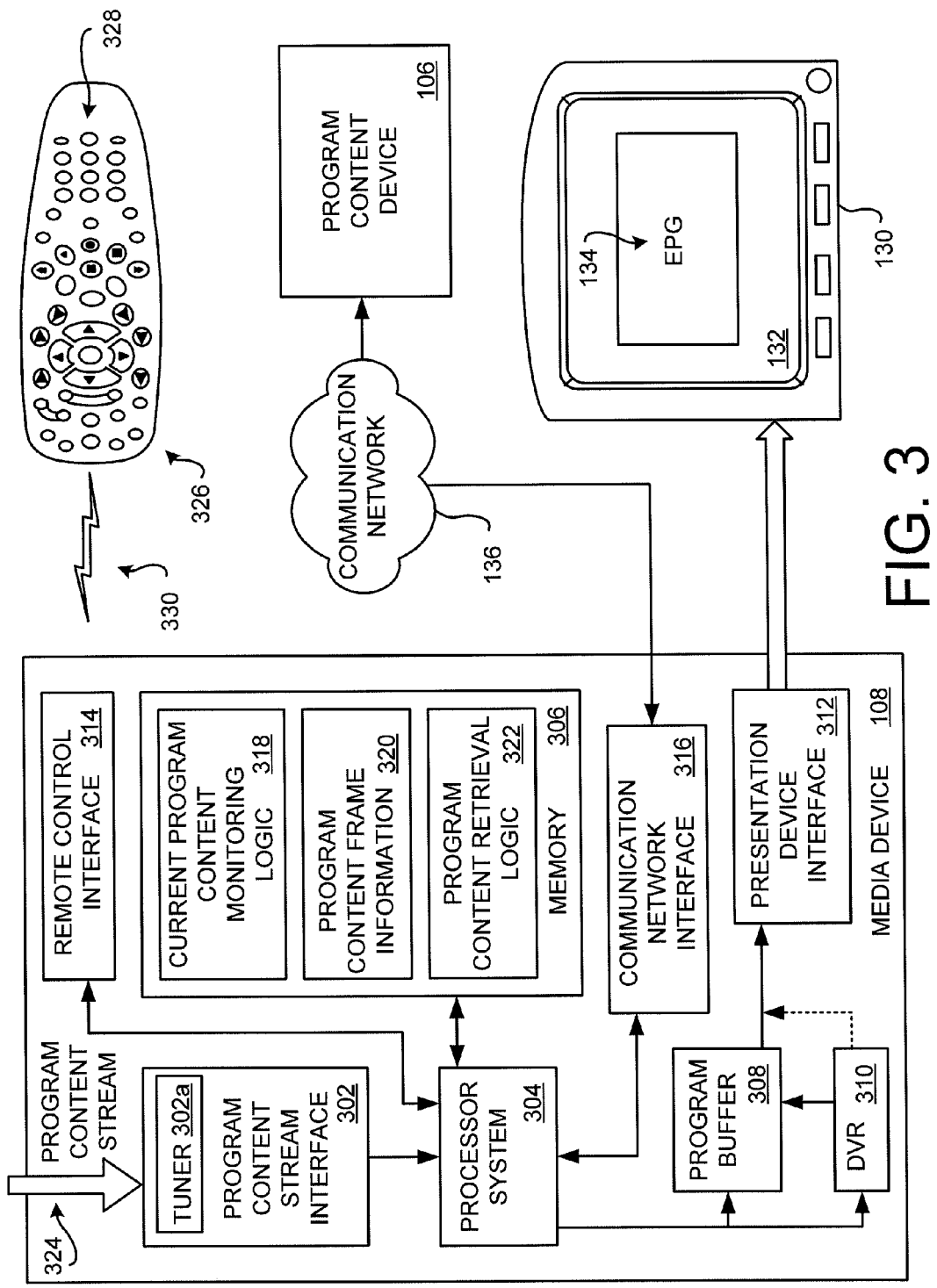
FIG. 3 is a block diagram of an embodiment of an exemplary media device.

FIG. 3 is a block diagram of an exemplary media device 108 with an embodiment of the program content retrieval system 100. Non-limiting examples of the media device 108 include, but are not limited to, a set top box (STB), stereos, radios, televisions (TVs), digital video disc (DVD) players, digital video recorders (DVRs), or personal computers (PCs).

The exemplary media device 108 comprises a program content stream interface 302, a processor system 304, a memory 306, a program buffer 308, an optional digital video recorder (DVR) 310, a presentation device interface 312, a remote control interface 314, and a communication network interface 316. The memory 306 comprises portions for storing the current program content monitoring logic 318, the program content frame information 320, and the program content retrieval logic 322. Other media devices may include some, or may omit some, of the above-described media processing components. Further, additional components not described herein may be included in alternative embodiments.

The functionality of the media device 108, here a set top box, is now broadly described. One or more program content streams 324 are received by the program content stream interface 302. One or more tuners 302a in the program content stream interface 302 selectively tune to one of the program content streams 324 in accordance with instructions received from the processor system 304.

A program content stream 324 typically comprises a plurality of programs multiplexed together, which are communicated in a packetized format and identified with a unique identifier and a PID. The processor system 304, based upon a request for a program of interest specified by a viewer, parses out program content associated with the program of interest. The program of interest is then assembled into a stream of video and/or audio information which may be saved into the program buffer 308 such that the program content can be streamed out to the media presentation device 130, such as the television, via the presentation device interface 312. Alternatively, or additionally, the program content may be saved into the DVR 310 for later presentation.

The exemplary media device 108 is configured to receive instructions from a viewer via a suitable control device, such as, but not limited to, the exemplary remote control 326. The remote control 326 includes one or more controllers 328. The viewer, by actuating one or more of the controllers 328, causes the remote control 326 to generate and transmit instructions, via a wireless signal 330, which is received by the remote control interface 314. In response to the viewer's commands, the media device 108 controls presentation of the presented program content.

The communication network interface 316 is communicatively coupled to the communication network 136, thus providing connectivity to the communication network interface 204 of the program content device 106. It is appreciated that in the event that the communication network 136 is a hybrid communication system that utilizes various communication media and/or formats, the media and/or format employed by the communication network interface 316 may be different from the media and/or format employed by the communication network interface 204.

The current program content monitoring logic 318 monitors current program content that is currently being processed for presentation on the media presentation device 130 and/or that is currently being processed for storage on the DVR 310. Thus, if a qualifying event, such as a service interruption or the like, occurs that would necessitate retrieval of interrupted program content from the program content device 106, the media device 108 will be operative to identify the particular one(s) of the received programs PSa-PSi for which the interrupted program content is to be retrieved from the program content device 106.

As video program content is received and processed, the unique identifiers of received video frames (and corresponding portions of the audio, closed captioning, and meta data) are saved into the program content frame information 320. Thus, at the detection of a qualified event, the media device 108 will be operative to identify the particular last video frame that was correctly received and processed.

When the occurrence of the qualifying event is detected by the current program content monitoring logic 318, the program content retrieval logic 322 initiates retrieval of the interrupted program content. The process recovering interrupted program content is initiated by causing the media device 108 to establish a connection with the program content device 106. Then suitable identifiers are communicated from the media device 108 to the program content device 106 which identify the interrupted program content.

The current program content monitoring logic 318 and the program content retrieval logic 322 are described as discrete logic. In other embodiments, the current program content monitoring logic 318 and the program content retrieval logic 322 may be integrated logic, or even combined with other logic not described herein. Further, the current program content monitoring logic 318, the program content frame information 320, and the program content retrieval logic 322 are described as residing in the memory 306. In other embodiments, the logic 318 and/or 322 may reside in a different memory media and/or device.

Figure 4:
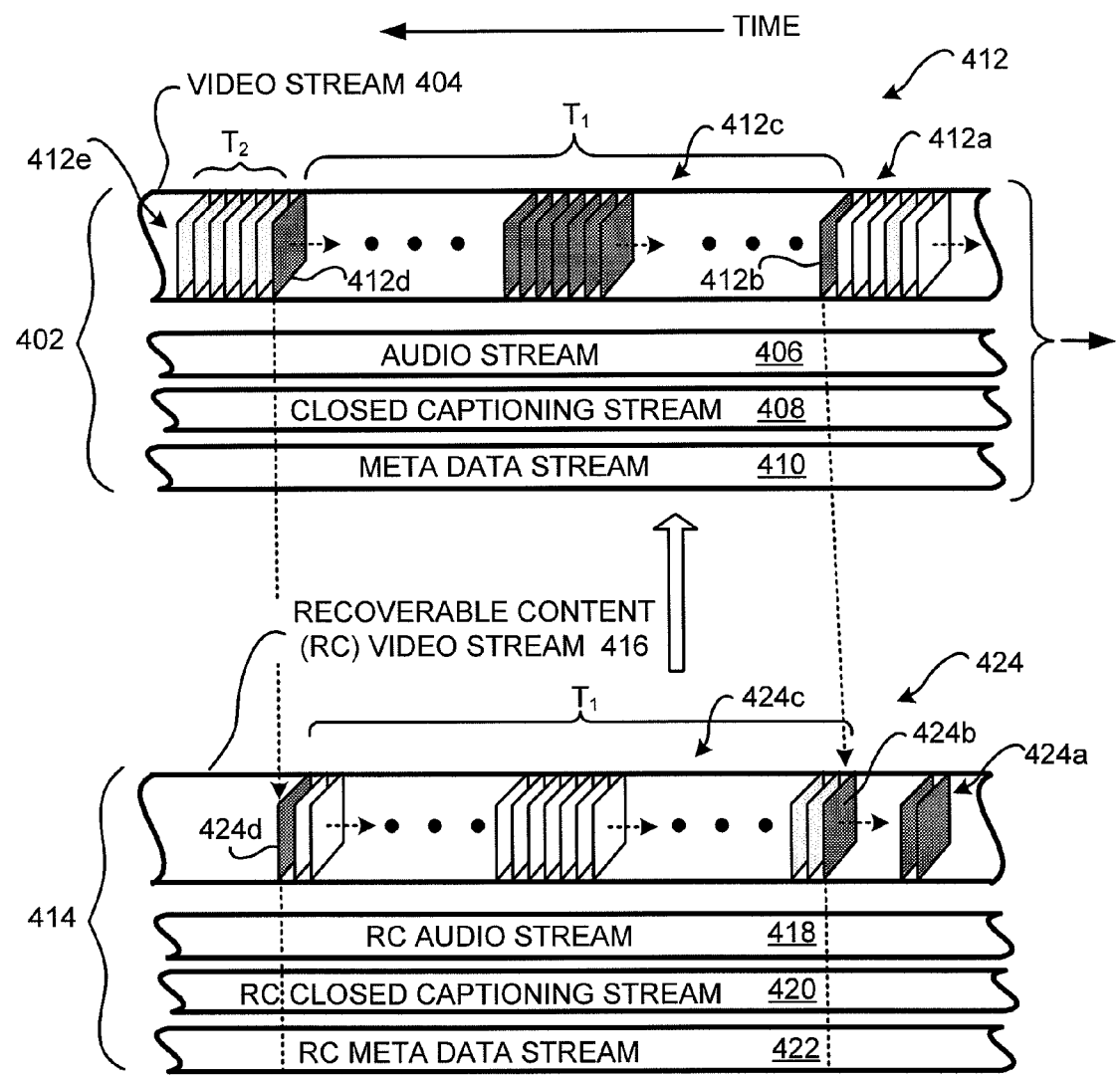
FIG. 4 conceptually illustrates recoverable interrupted program content.

FIG. 4 conceptually illustrates a program stream 402 corresponding to a program of interest that is received by the media device 108 and that is then processed for presentation to a viewer. The program stream 402 includes a video stream 404, a corresponding audio stream 406, an optional corresponding closed captioning stream 408, and a corresponding meta data stream 410.

The video stream 404 is comprised of a plurality of serially sequenced video frames 412, each having a particular video image of the program of interest. The video frames 412 are serially presented so as to create a moving picture. Individual video frames 412 (and corresponding portions of the audio, closed captioning, and/or meta data) have related unique identifiers. Non-limiting unique identifiers may include a time stamp and/or a frame identifier (ID).

The audio stream 406 may include spoken words, music, and background sounds. The audio stream 406 is sequenced with the video frames 412 such that spoken words, music, and background sounds of the audio stream 406 correspond in time with the moving picture. The closed captioning stream 408 is also conceptually illustrated as part of the program stream 402. The closed captioning stream 408 is typically a textual presentation of the words of the audio stream 406. The textual presentation is provided for hearing impaired viewers or for viewers in an area with relatively loud ambient noise levels, such as a bar or the like. The words of the closed captioning stream 408 are sequenced so as to generally correspond to the spoken words of the audio stream 406. Some program streams 402 may include the meta data stream 410 which contains other information of interest.

The program stream 402 conceptually illustrates a series of video frames 412a which are received and processed prior to the qualifying event. The qualifying event prevents subsequent processing of the program stream 402. Accordingly, the current program content monitoring logic 318 recognizes that the video frame 412b is the last properly received and processed one of the video frames 412. The video frame 412b corresponds to the beginning of the qualifying event (and accordingly, may be referred to as a beginning video frame 412b).

The unique identifier of the last properly received and processed video frame 412b is stored by the program content frame information 320. Accordingly, as a subsequent video frame (or a subsequent corresponding portion of the audio, closed captioning, and meta data information) is not received, is not properly processed, and/or is not of acceptable quality, then the identity of the beginning video frame 412b (and/or the corresponding portion of the audio, the closed captioning, and the meta data information) is known since this information has been saved into the program content frame information 320.

At some point in time, the qualifying event concludes. Accordingly, a plurality of video frames 412c will have not been properly received and/or processed during the duration $T_1$ of the qualifying event. After the conclusion of the duration $T_1$ of the qualifying event, the media device 108 begins to receive and/or process the remaining duration $T_2$ of the program of interest. Thus, a first video frame 412d is properly received and processed. The video frame 412d corresponds to the conclusion of the qualifying event (and accordingly, may be referred to as an ending video frame 412d).

The identity of the video frame 412d is determinable. The unique identifier of the video frame 412d has been stored by the program content frame information 320.

Preferably, the media device 108 would monitor for the receipt of some predetermined number of "good" frames, and/or the receipt of "good" frames for some predetermined duration, prior to determining that the qualifying event has concluded. Thus, intermittent receipt of "good" frames would not be misinterpreted as the conclusion of the qualifying event.

Prior to the start of the qualifying event, the same program of interest has been received and stored by the program content device 106. FIG. 4 conceptually illustrates this saved program of interest, referred to herein as a recoverable content (RC) program stream 414. The RC program stream 414 includes a RC video stream 416, a RC audio stream 418, an RC optional closed captioning stream 420, and a RC meta data stream 422.

Like the program stream 402 received at the media device 108, the RC program stream 414 comprises a series of video frames 424. The individual video frames 424 (and corresponding portions of the audio, closed captioning, and/or meta data) have related unique identifiers that also correspond to, or are identical to, the identifiers of the video frames 412.

In this example, a series of stored recoverable video frames 424a correspond to the video frames 412a that were received and processed by the media device 108 prior to the initiation of the qualifying event. A recoverable video frame 424b corresponds to the last known "good" video frame 412b received by the media device 108 (and accordingly, may be referred to as a beginning recoverable video frame 424b). Recoverable video frames 424c correspond to the frames 412c that were lost during the duration $T_1$ of the qualifying event. A recoverable video frame 424d corresponds to the video frame 412d that is properly received and processed by the media device 108 after conclusion of the qualifying event (and accordingly, may be referred to as an ending recoverable video frame 412d). Similarly, portions of the RC audio stream 418, the RC optional closed captioning stream 420, and the RC meta data stream 422 correspond, respectively, to portions of the audio stream 406, the closed captioning stream 408, and the meta data stream 410.

Upon initiation of the qualifying event, as detected by the current program content monitoring logic 318, the program content retrieval logic 322 establishes a connection between the media device 108 and the program content device 106, and communicates a request for recoverable program content to the program content device 106. In an exemplary embodiment, the request for recoverable interrupted program content includes the unique identifier of the video frame 412b. Alternatively, or additionally, other embodiments may provide other suitable identifiers, such as for corresponding portions of the audio stream 406, the closed captioning stream 408, and the meta data stream 410. Alternatively, or additionally, other embodiments may provide a suitable global identifier, such as a time stamp or the like, which identifies the lost portion of the program of interest.

Upon receipt of a suitable request for recoverable program content, the recoverable video frame 424b, and corresponding portions of the audio, closed captioning, and/or meta data, is retrieved from memory 208 of the program content device 106, and is then communicated to the media device 108.

Alternatively, the next video frame (the first one of the recoverable video frames 424c and its corresponding portions of the audio, closed captioning, and/or meta data) is retrieved and communicated to the media device 108. Then, recoverable video frames 424c (and their corresponding portions of the audio, closed captioning, and/or meta data) are likewise retrieved and communicated to the media device 108.

Presentation of the program of interest may be resumed once the recoverable video frame 424b has been received and processed by the media device 108 (assuming that the recoverable video frames 424c, or a sufficient portion thereof, is also available to meaningfully assemble the interrupted program content). Since the qualifying event is not yet over, communication of the stream of recoverable video frames 424c (and corresponding portions of the audio, closed captioning, and/or meta data) from the program content device 106 to the media device 108 continues.

It is appreciated that some discrete amount of time is required to establish the connection between the media device 108 and the program content device 106, and to receive the recoverable interrupted program content from the program content device 106, and then to process and present (or store) the received interrupted program content. Thus, there may be some duration of interruption time that is perceptible to the viewer. However, such a presentation interruption time will be relatively short. During the duration of the presentation interruption time, a suitable message may be presented to the viewer to indicate that program content is being recovered and that presentation will resume after a short delay.

At some point in time, the qualifying event ends. A message is then communicated from the media device 108 to the program content device 106 that indicates the conclusion of the qualifying event.

As noted above, the media device 108 begins to receive and/or process the remaining duration $T_2$ of the program of interest. The video frame 412d corresponds to the conclusion of the qualifying event. Thus, the ending video frame 412d, and the subsequent video frames 412e, are properly received and processed at the media device 108. Here, the remaining duration $T_2$ of the program of interest constitutes a continuing portion of the program of interest that is now receivable at the media device 108 from the media transmit facility 114.

The continuing portion of the program of interest received from the media transmit facility 114 (video frame 412d and the subsequent video frames 412e) are then saved by the media device 108. For example, video frame 412d, and the subsequent video frames 412e, may be saved into the DVR 310 or another suitable memory medium. Also, corresponding portions of the audio, closed captioning, and/or meta data are received, processed and saved by the media device 108.

Since there was an interruption duration (corresponding to the initiation of the qualifying event and the time that the recoverable interrupted program content starts to be received from the program content device 106 and processed for presentation), there will be some corresponding amount of time that is required for complete transmittal of the recovered program content from the program content device 106 to the media device 108. That is, video frame 412d is received and processed in real time, and its corresponding recoverable video frame 424d will arrive at the media device 108 after some discernable period of time.

When the recoverable video frame 424d is finally received and processed, then the current program of interest that has been saved (for example, on the DVR 310) may be retrieved and then presented. Thus, the communication of the recoverable interrupted program content from the program content device 106 to the media device 108 ends. Upon conclusion of the presentation of the recovered program content, presentation of the program of interest is then based upon the video frames 412e previously received and stored by the media device 108.

In an exemplary embodiments, the program stream 402 and/or the RC program stream 416 are formatted under the moving pictures expert group (MPEG) formats, such as MPEG-2 or MPEG-4. Thus, the frames 412b, 412d, 424b, and/or 424d are preferably a reference frame, such as an I-frame or a P-frame. For example, if the qualifying event occurs at a time when a compressed frame (that is based upon information from a previous reference frame), then the request for the recovered program content is based upon the last "good' reference frame received. Thus, the entire program of interest is recoverable in view that all of the information necessary to construct the entire video program portion is available at the media device 108.

It is appreciated that if other programs of interest are being concurrently recorded in the DVR 310 of the media device 108, the request for recoverable content may optionally include a request for those recorded programs of interest. Further, the media device 108 can be configured to record programs of interest at times when the media device 108 is not being used to present programming to a viewer. Since embodiments of the program content retrieval system 100 act automatically in response to the initiation of the qualifying event, the received recoverable portion of the program of interest (the recoverable video frames 424c, and the associated audio, closed captioning, and meta data portions) can be saved into the DVR 310. Thus, when the recorded program of interest is retrieved from the DVR 310 and is presented, the entire program of interest can be presented interruption free, or substantially interruption free, since the entirety of the program of interest resides on the DVR 310.

Some embodiments of the program content retrieval system 100 may be configured to retrieve portions of a program of interest from the program content device 106 in response to a user command generated at the media device 108. For example, a viewer may generate a request for program content presentation that requires retrieval of program content form the program content device 106.

FIG. 5 is a block diagram of a hypothetical current EPG 134 generated by the media device 108 and presented on the media presentation device 130. The EPG 134 presents program information currently available on a plurality of programming channels, here identified by their station identifier.

To illustrate, assume that a viewer wishes to view Program A1 that is available on the channel corresponding to Station A. In this simplified example, the current time is 9:20 p.m. However, presentation of the program of interest, Program A1, started at 8:00 p.m. If the media device 108 tunes to and receives the program content corresponding to Program A1, presentation of the Program A1 will begin at the current time of 9:20 p.m. Accordingly, the viewer will miss presentation of the Program A1 from its 8:00 p.m. start time up through the current time of 9:20 p.m.

Embodiments of the program content retrieval system 100 may be configured to cause the media device 108 to establish communications with the program content device 106, and retrieve the previously available portion of Program A1. That is, the start of the Program A1 is substantially equivalent to the above-described recoverable video frame 424a. Thus, presentation of Program A1 can begin with its first frame that was presented at 8:00 p.m.

While the program content corresponding to Program A1 from 8:00 p.m. through 9:20 p.m. is being recovered from the program content device 106, the currently received portions of the Program A1 can be stored at the media device 108. For example, the portion of Program A1 corresponding to the presentation times 9:20 p.m. through 11:00 p.m. can be saved into the DVR 310 or another suitable memory media. Then, when all of the interrupted program content received from the program content device 106 has been presented, corresponding to the Program A1 at time 9:20 p.m., presentation can resume based on the previously received program content stored by the media device 108. That is, at 10:40 p.m., presentation of the Program A1 is based on the stored program content for Program A1 previously received by the media device 108 at 9:20 p.m.

The above-described retrieval of the portion of the program of interest that has been missed may occur automatically in some embodiments. In other embodiments, the viewer may be prompted, via the EPG 134, to initiate recovery of the missed portion of the program of interest. Alternatively, or additionally, one of the controllers 328 on the remote control 326 may be predefined as a special function button that may be selectively actuated by the viewer to cause retrieval of the portion of the program of interest that has been missed.

Some embodiments of the program content retrieval system 100 may be configured to retrieve a program of interest that has already been presented. For example, a viewer may navigate about the EPG 134 and select Program B1 that was previously available on Station B from 8:00 p.m. to 9:00 p.m. Here, the start of the Program B1 corresponds to the above-described video frame 424b and the end of the Program B1 corresponds to video frame 424d. Thus, the entirety of the Program B1 can be recovered from the program content device 106. Embodiments of the program content retrieval system 100 can provide previously presented program of interest so long as they are available from the program content device 106.

Media providers may provide programming to their customers via other types of communication systems. For example, some media providers may use a cable network or the Internet to provide programming to their customers. Embodiments of the program content retrieval system 100 may be configured to operate over, and in cooperation with, any suitable type of communication system that delivers program content to the media device 108.

It should be emphasized that the above-described embodiments of the program content retrieval system 100 are merely possible examples of implementations of the invention. Many variations and modifications may be made to the above-described embodiments. All such modifications and variations are intended to be included herein within the scope of this disclosure and protected by the following claims.

The embodiments of the invention in which an exclusive property or privilege is claimed are defined as follows:

1. A media device comprising:
a first interface coupled to an antenna that is configured to receive a program content stream that is being broadcast in a signal from a satellite that has received the program content stream from a media transmit facility, wherein the program content stream includes at least one program of interest;
a processor system,
wherein the processor system is configured to process the received program of interest for communication to a media presentation device,
wherein the processor system is configured to determine an occurrence of a qualifying event that indicates that a portion of the program of interest is unavailable at the media device, wherein the qualifying event is associated with weather interference of the signal being broadcast from the satellite such that a plurality of video frames of the program of interest are not correctly received and processed by the processor system, wherein the processor system is configured to identify a last properly received and processed video frame of the program of interest received in the signal from the satellite, and wherein the processor system is configured to generate a request for a recoverable portion of the program of interest corresponding to the unavailable portion of the program of interest, wherein the request identifies the last properly received and processed video frame of the program of interest;

a second interface configured to establish a backchannel to communicatively couple the media device to a program content device via the backchannel, wherein the backchannel is established in response to determining the occurrence of the qualifying event by the processor system;

wherein the second interface is configured to communicate the request to the program content device, and wherein the second interface is configured to receive the recoverable portion of the program of interest from the program content device over the backchannel between the media device and the program content device, wherein the received recoverable portion of the program of interest includes at least a beginning recoverable video frame that corresponds to the last properly received and processed video frame of the program of interest; and a memory communicatively coupled to the processor system and communicatively coupled to at least the first interface, and configured to store a continuing portion of the program of interest that becomes available from the program content stream in the signal received from the satellite after conclusion of the qualifying event, wherein the processor system is further configured to process the received continuing portion of the program of interest for communication to the media presentation device, and is further configured to retrieve and process the stored remaining duration of the program of interest after the conclusion of the qualifying event.

2. The media device of claim 1, further comprising:

a presentation device interface configured to communicatively couple the media device to the media presentation device, wherein an initial portion of the program of interest is communicated via the presentation device interface to the media presentation device up to a time corresponding to the occurrence of the qualifying event, wherein the recoverable portion of the program of interest is then communicated via the presentation device interface to the media presentation device, and wherein the continuing portion of the program of interest is retrieved from the memory and is communicated via the presentation device interface to the media presentation device in response to a conclusion of the communication of the recoverable portion of the program of interest to the media presentation device.

3. The media device of claim 1, wherein the memory is configured to store a currently received portion of the program of interest received from the media transmit facility, and the media device further comprising:

a remote control interface operable to receive a request from a remote control for presentation of the program of interest, wherein a presentation of the program of interest started prior to detecting the request to present the program of interest; and a presentation device interface configured to communicatively couple the media device to the media presentation device, wherein the recoverable portion of the program of interest is first communicated via the presentation device interface to the media presentation device, and wherein the currently received portion of the program of interest is retrieved from the memory and is communicated via the presentation device interface to the media presentation device in response to a conclusion of the communication of the recoverable portion of the program of interest to the media presentation device.

4. A method for accessing recoverable program content by a media device, the method comprising:

receiving a signal with a program of interest that is broadcast to the media device from a satellite, wherein the program of interest is presented on a media presentation device;

detecting an occurrence of a qualifying event, wherein the qualifying event is associated with weather interference of the signal being broadcast from the satellite such that a plurality of video frames of the program of interest are not correctly received and processed at the media device, identifying an identifier of at least one last video frame of the plurality of video frames of the program of interest that were not correctly received and processed at the media device;

establishing a backchannel between the media device and a program content device in response to detecting the occurrence of the qualifying event;

communicating a request from the media device to the program content device via the established backchannel, wherein the request includes the identifier of the at least one last video frame, wherein the request is for a recoverable portion of the program of interest from the program content device, wherein the requested recoverable portion of the program of interest includes the at least one last video frame; and receiving at the media device via the backchannel the recoverable portion of the program of interest from the program content device, wherein the received portion of the program of interest is then presented on the media presentation device instead of the program of interest being in the signal broadcast from the satellite;

monitoring currently received video frames of the program of interest in the received signal broadcast from the satellite for a plurality of good video frames, wherein a good video frame is a video frame that is correctly received and processed at the media device;

identifying an identifier of at least one of the plurality of good video frames;

storing at the media device a continuing portion of the program of interest received in the signal being broadcast from the satellite after the plurality of good video frames are received, wherein the continuing portion of the program of interest includes the at least one good video frame; and retrieving the stored continuing portion of the program of interest after an identity of a video frame in the recoverable portion of the program of interest received from the program content device corresponds to the identifier of the good video frame;

wherein presentation of the recoverable portion of the program of interest received from the program content device ends, and wherein presentation of the stored continuing portion of the program of interest resumes.

5. The method of claim 4, wherein monitoring the currently received video frames of the program of interest in the received signal broadcast from the satellite for the plurality of good video frames comprises:

monitoring the currently received video frames of the program of interest in the received signal broadcast from the satellite for the plurality of good video frames received over a predefined duration, wherein all of the currently received video frames received during the predefined duration are good video frames.

6. The method of claim 4, wherein monitoring the currently received video frames of the program of interest in the received signal broadcast from the satellite for the plurality of good video frames comprises:

monitoring the currently received video frames of the program of interest in the received signal broadcast from the satellite for a predefined number of video frames, wherein all of the predefined number of video frames are good video frames.

7. The method of claim 4, the method further comprising:

communicating a message from the media device to the program content device after the plurality of good video frames are received at the media device, wherein the message indicates a conclusion of the weather interference, wherein communication of the recoverable portion of the program of interest from the program content device is ended in response to communicating the message.

8. The method of claim 4, wherein the program content device is a local program content device that is one of a plurality of program content devices, wherein the plurality of program content devices are distributed so that each one of the program content devices are associated with a different predefined geographic region, wherein the media device communicating the request for the recoverable portion of the program of interest is located in a predefined geographic region of interest associated with the local media presentation device, and:

wherein communicating the request to establish the backchannel further comprises communicating the request to establish the backchannel between the media device and the local program content device in response to detecting the occurrence of the qualifying event, wherein establishing the backchannel further comprises establishing the backchannel between the media device and the local program content device, and wherein communicating the request for the recoverable portion of the program of interest further comprises communicating the request to the local program content device.

9. The method of claim 4, further comprising:

generating a message in response to detecting the occurrence of the qualifying event, wherein the message is then presented on the media presentation device, and wherein presentation of the message is replaced by presentation of the recoverable portion of the program of interest received from the program content device.

10. The media device of claim 1, wherein the processor system is further configured to identify an identifier of the last properly received and processed video frame of the program of interest received in the signal from the satellite, and wherein the request for the recoverable portion of the program of interest includes the identifier that identifies the last properly received and processed video frame of the program of interest, and wherein the requested recoverable portion of the program of interest includes the last properly received and processed video frame that is identified by the identifier.

* * * * *